Dec. 20, 1955  W. H. WETZEL  2,727,349
POWER MOWER HAVING ROTARY DISK CUTTER
Filed Nov. 27, 1953  2 Sheets—Sheet 1
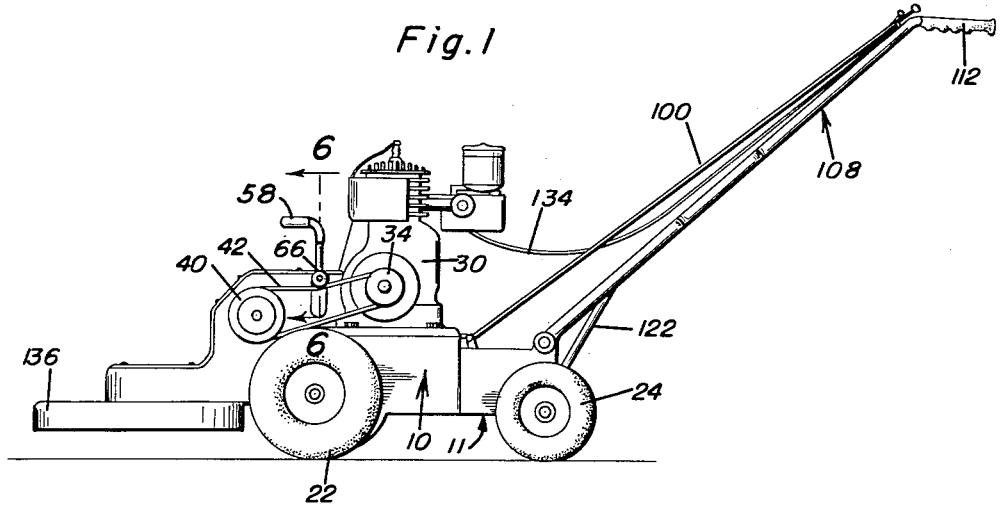
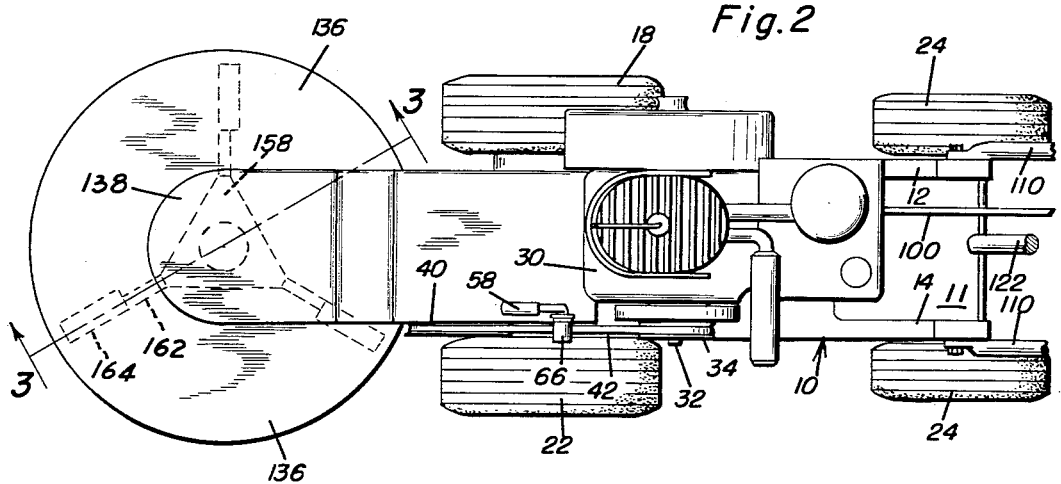
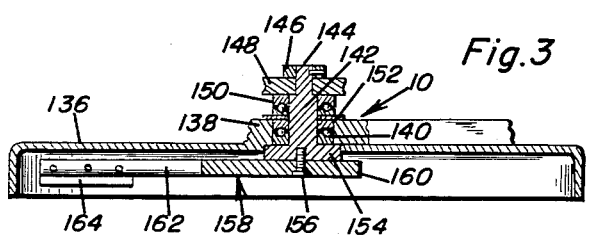
William H. Wetzel
INVENTOR.

Dec. 20, 1955  W. H. WETZEL  2,727,349
POWER MOWER HAVING ROTARY DISK CUTTER
Filed Nov. 27, 1953 2 Sheets—Sheet 2
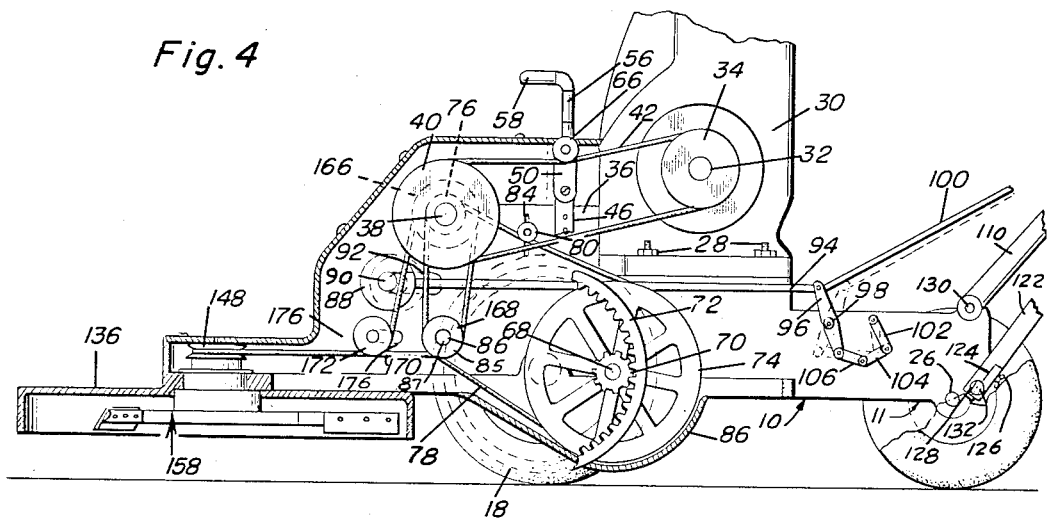
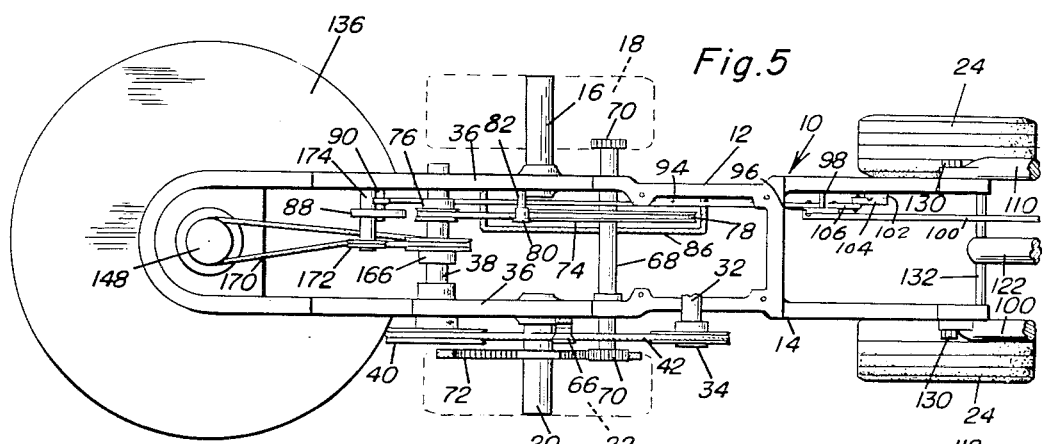
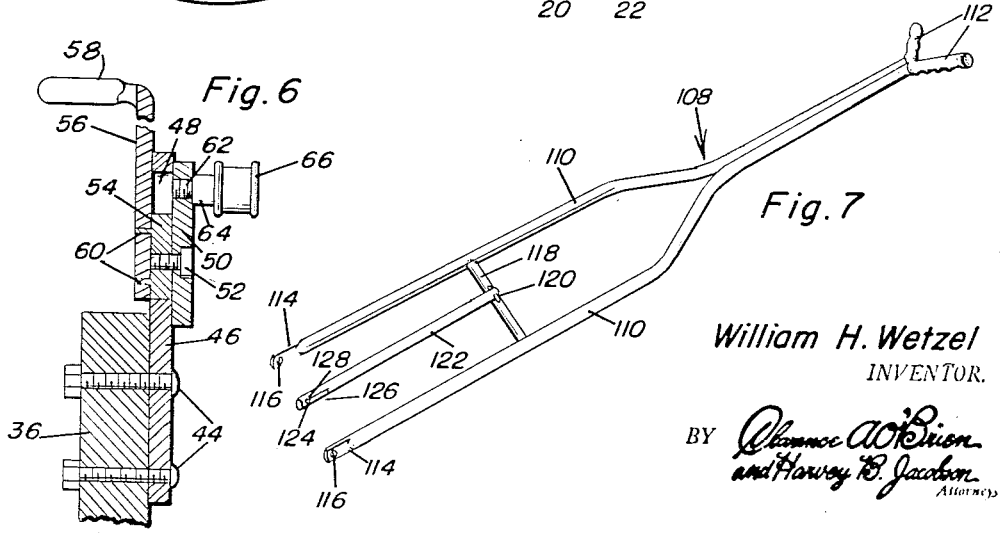
William H. Wetzel
INVENTOR.

United States Patent Office 2,727,349
Patented Dec. 20, 1955

2,727,349

POWER MOWER HAVING ROTARY DISK CUTTER

William H. Wetzel, Croydon, Pa.

Application November 27, 1953, Serial No. 394,722

4 Claims. (Cl. 56—25.4)

This invention relates in general to improvements in lawn mowers, and more specifically to an improved power lawn mower.

The primary object of this invention is to provide an improved power mower which includes novel drive means, whereby a single power unit may be conveniently connected to either or both its rotary blade and the drive wheels thereof.

Another object of this invention is to provide an improved power mower which includes novel means for operatively connecting drive wheels thereof to a power unit, the means being remotely controllable from the handle of the power mower and lockable in an operable position.

Another object of this invention is to provide an improved power mower which is of extremely simple construction and which is formed of readily obtainable materials so as to be economically feasible.

A further object of this invention is to provide a novel linkage arrangement for moving an idler pulley, whereby the idler pulley may be selectively retained in either a belt-tensioning position or an inoperative position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the power mower which is the subject of this invention and shows the general outline thereof;

Figure 2 is an enlarged top plan view of the power mower of Figure 1, a rear portion of the handle thereof being omitted;

Figure 3 is an enlarged fragmentary vertical sectional view taken substantially upon the plane indicated by the section line 3—3 of Figure 2, and shows the general mounting arrangement of the rotary blade construction of the mower;

Figure 4 is an enlarged fragmentary side elevational view of the power mower of Figure 1 with parts thereof being broken away and shown in section, in order to clearly illustrate the details of the drive means;

Figure 5 is an enlarged fragmentary horizontal sectional view taken through the power mower with portions thereof being omitted and other portions being shown in dotted lines, in order to clearly illustrate the general arrangement of the drive means;

Figure 6 is an enlarged fragmentary vertical sectional view taken substantially upon the plane indicated by the section line 6—6 of Figure 1, and shows the manner in which an idler pulley is adjustably mounted; and Figure 7 is an enlarged perspective view of the handle construction of the power mower.

Referring now to the drawings in detail, it will be seen that the power mower which is the subject of this invention includes an elongated, generally rectangular frame which is referred to in general by the reference numeral 10. The frame 10 is preferably cast as a unit, and includes a pair of integral, longitudinally extending, spaced parallel frame rails 12 and 14. Rigidly secured to the frame rail 12 and extending outwardly therefrom is a first axle 16 on which is mounted a drive wheel 18 while rigidly secured to the frame rail 14 and extending outwardly therefrom in alignment with the axle 16 is an axle 20 on which is mounted a drive wheel 22. Also carried by the frame 10 at the rear 11 thereof are trailing wheels 24, which are suitably supported on axles 26 extending outwardly from the frame rails 12 and 14.

Mounted on the frame rails 12 and 14 intermediate their ends and secured thereto by suitable fasteners 28 is a power unit 30. The power unit 30 is preferably in the form of an internal combustion engine. The power unit 30 includes a drive shaft 32 which has mounted on one end thereof a drive pulley 34. It will be noted that the drive pulley 34 is disposed outwardly of the confines of the frame 10 adjacent the frame rail 14.

Each of the frame rails 12 and 14 is provided forwardly of the power unit 30 with an upwardly extending portion 36. Suitably journaled in the upwardly extending portions 36 is a transversely extending drive shaft 38. The drive shaft 38 has one end thereof extending outwardly of the frame rail 14, the one end being provided with a pulley 40. The pulley 40 is in its plane of rotation aligned with that of the pulley 34 and is operatively connected thereto by a flexible drive belt 42.

Referring now to Figure 6 in particular, it will be seen that the upwardly extending portion 36 of the frame rail 14 has secured thereto by vertically spaced fasteners 44 a vertically extending plate 46. The plate 46 is provided in the upper part thereof with a vertically extending slot 48.

Abutting the outer face of the plate 46 is a relatively small plate 50, which has extending through a lower portion thereof a lock screw 52. The lock screw 52 is adjustably threaded in an elongated, relatively narrow block 54, which block is vertically slidable within the slot 48. Against the inner surface of the plate 46 is an upwardly extending arm 56, which terminates in a horizontally disposed handle 58 and is rigidly secured to said block 54 by a pair of pins 60.

It will be understood that the block 54 is of a slightly less width than the thickness of the plate 46. Thus, when the lock screw 52 is tightened, the plate 46 is clamped between the arm 56 and the plate 50. By loosening the lock screw 52, the entire assembly may be moved vertically with respect to the plate 46 through the use of handle 58. Then, through the utilization of the lock screw 52, the assembly may be clamped in place. However, if so desired, the frictional relationship between the plates 50 and 46 and the arm 56 may be such that the unit may be forcibly adjusted through the use of the handle 58, and at the same time will be retained in any selected position.

Carried by the upper part of the plate 50 is a stud 62 which extends outwardly therefrom. Said stud 62 is a part of a shaft 64 on which is rotatably mounted an idler pulley 66. As is best illustrated in Figure 4, the idler pulley 66 bears against the drive belt 42 and when properly positioned tensions the drive belt 42 to assure the driving connection between the pulleys 34 and 40. When the idler pulley 66 is in an upper position, the drive belt 42 is not tensioned, and the pulleys 34 and 40 are not operatively connected, so that the power unit 30 may run without driving the drive shaft 38.

Extending transversely between and rotatably journaled in the frame rails 12 and 14 is a shaft 68. This shaft 68 is disposed rearwardly of the axles 16 and 20 and extends in opposite directions outwardly beyond the frame rails 12 and 14 while upon its ends are gears 70. The gears 70 mesh with internal gear rings 72 of the wheels 18 and 22, as is best illustrated in Figures 4 and 5. Thus, when the shaft 68 is rotated, the drive wheels 18 and 22 will be likewise rotated.

Carried by the transverse shaft 68 adjacent the frame rail 12 and within the confines of the frame 10 is a pulley 74, which revolves in alignment with a pulley 76 carried by the drive shaft 38. Operatively connecting the pulleys 74 and 76 is a drive belt 78, which is adjustably tensioned by an idler pulley 80. The idler pulley 80 is mounted on a shaft 82, which is adjustably positioned in a vertical slot 84 in the upper portion 36 of the frame rail 12. Also, it will be seen that carried by the frame rail 12 is a suitable housing 86 for the pulley 74.

In addition to passing around the pulleys 74 and 76 and below the idler pulley 80, the drive belt 78 also passes around a pulley 85 carried by a transversely extending shaft 87 which is disposed immediately below the drive shaft 38. Mounted vertically between the pulley 76 and pulley 85 and disposed forwardly thereof is a second idler pulley 88 for the drive belt 78. The idler pulley 88 is carried by a horizontal shaft 90 which is adjustably mounted in a horizontal slot 92 in the vertically extending portion 36 of the frame rail 12.

The idler pulley 88 is adjustably positioned by an elongated horizontally extending rod 94 whose rear end is connected to an upper end of an elongated lever 96. The lever 96 is pivotally mounted on a pivot pin 98 carried by the frame rail 12 and positioned inwardly thereof. The pivot pin 98 passes through the lever 96 at its midpoint. Also pivotally connected to the upper end of the lever 96 at its point of juncture with the shaft 94 is an upwardly and rearwardly extending rod 100. It will be seen that when the rod 100 is moved upwardly and rearwardly, the shaft 94 also moves rearwardly, causing the idler pulley 88 to engage a forward vertically extending portion of the drive belt 78 to adjustably tension the drive belt. It will be understood that the idler pulley 80 only takes out the slack in the drive belt, which is not otherwise taken out by the idler pulley 88, so as to eliminate adjustment of the linkage for correctly positioning the idler pulley 88.

In order that the idler pulley 88 may be retained in a belt-tensioning position, there is pivotally connected to the frame rail 12 rearwardly of the pivot pin 98 a link 102. The free end of the link 102 is connected to the free end of the lever 96 remote from its connection to the shaft 96 and the rod 100 by a pair of links 104 and 106, which are pivotally connected together at their adjacent ends. As is best illustrated in Figure 4 by dotted lines, when the rod 94 is in a rearmost position, the links 104 and 106 are in horizontal alignment. This arrangement retains the idler pulley 88 in its rearward belt-tensioning position, until sufficient force is applied to the rod 100 to cause shifting of the links 104 and 106 to move them from their dead center positions.

Referring now to Figure 7 in particular, it will be seen that there is illustrated a handle construction which is referred to in general by the reference numeral 108. The handle construction 108 includes a pair of rearwardly extending arms 110, which have their forward portions in spaced parallel relation, and their rear portions rigidly connected together. The arms 110 terminate in rearwardly and outwardly diverging portions, which are covered by suitable grip members 112. The forward ends of the arms 110 are flattened as at 114 and are provided with transversely aligned apertures 116.

Extending between the forward portions of the arms 110 intermediate their ends is a transverse bar 118. Pivotally connected to the bar 118, as at 120, is a brace 122. The brace 122 is provided with a movable forward end segment 124 which is removably clamped in position by a bolt or screw 126. The segment 124 and the adjacent portion of the brace 122 are provided with a transversely extending bore 128.

Referring now to Figures 4 and 5 in particular, it will be seen that the handle 108 is secured to the frame 10 by a pair of pivots 130 which extend through the apertures 116 in the arms 110, and pivotally secure them to the upper rear portions of the frame rails 12 and 14. Further, it will be seen that extending between the lower rear portions of the frame rails 12 and 14 is a transverse bar 132, to which the lower end of the brace 122 is rigidly secured. Thus, it will be seen that the handle 108 is rigidly retained in an upwardly and rearwardly sloping position, as is best illustrated in Figure 1.

Referring now to Figure 1 in particular, it will be seen that extending upwardly and rearwardly from the power unit 30 is a control cable 134, which terminates at the upper end of the handle 108 for control of the said unit by the operator. Also, it will be seen that the rod 100 terminates at the upper end of the handle 108 for convenient manipulation. Thus, it will be seen that the operation of the power mower may be controlled by one gripping the handle 108 through the use of the handle grips 112.

Carried at the forward end of the frame 10 is an enlarged circular, downwardly opening housing 136, which is of a greater diameter than the exterior tread of the drive wheels 18 and 22 and is carried at the underside of the frame rails 12 and 14, while from its periphery projects downwardly a preferably circumferentially continuous flange 137.

As is best illustrated in Figure 3, the forward end of the frame 10 is provided with a relatively thick bearing-supporting portion 138 in which is mounted a suitable bearing 140. Extending downwardly through the bearing 140 and rotatably mounted therein is a vertical shaft 142 which functions as a cutter-rotating support. Mounted on the extreme upper end of said cutter shaft 142, which is reduced in diameter as at 144, is a collar 146 which retains a pulley 148 thereon. The pulley 148 overlies a thrust bearing 150 which, in turn, overlies a locking ring 152. The locking ring 152 overlies the bearing mounting portion 138 and prevents downward movement of the shaft 142.

Removably secured to an enlarged lower end 154 of the shaft 142 by a bolt 156 is a rotary blade assembly 158, which includes a central hub 160, which has extending therefrom a plurality of radiating arms 162. The arms 162 have removably secured to the other end thereof cutter blades 164, each of which slopes diagonally upwardly and rearwardly from its depending cutting edge, having reference to its normal direction and path of movement.

It will be understood that the effective cutting area of the rotary blade assembly 158 is wider than the exterior tread of the drive wheels 18 and 22. Thus, it will be seen that a full swath may be cut during a single course of the power mower.

Referring now to Figures 4 and 5, it will be seen that the drive shaft 38 is provided at substantially its midpoint with a pulley 166. The pulley 166 has aligned therewith a pulley 168 carried by the shaft 86, the pulley 168 being disposed vertically below the pulley 166. The pulley 168 is considered a direction-changing pulley that alters the direction of a drive belt 170 entrained thereover from a vertical direction to a horizontal direction.

After the drive belt 170 leaves the pulley 168, it passes forwardly around the pulley 148. The drive belt 170 then extends rearwardly and passes around an idler 172. This idler is disposed forwardly of and in longitudinal alignment with said idler 166. Also, the pulley 172 is disposed in alignment with, both vertically and longitudinally, the pulley 168, and said idler changes the direction of the drive belt 170 from a horizontal direction to a vertical direction, so that it may again pass over the pulley 166.

Said idler 172 is rotatably carried by a transversely extending shaft 174 carried by the frame rail 12, said shaft being mounted for adjustment in a horizontal slot 176 in the frame rail 10. It will be seen that by moving the pulley 172 rearwardly, the tension of the drive belt 170 may be adjusted as desired, to ensure driving of the rotary blade assembly 158.

What is claimed as new is as follows:

1. A power mower, comprising a frame having a power unit mounted thereon, a pair of forward wheels and at least one rear wheel operatively supporting said frame, selective drive means operatively connecting said power unit to said forward wheels, a housing comprising a substantially flat, horizontally disposed disk-like member of substantially circular outline and having a peripheral depending flange, said housing being supported from said frame forwardly of said front wheels, a rotatable cutter supported below said disk-like member and above the bottom of said flange, means to operatively interconnect said cutter and said power unit, and a handle means connected to said frame and extending upwardly and rearwardly to a point rearwardly of said wheels, whereby said mower may be tilted about said rear wheels to raise said cutter.

2. A power mower, comprising a frame having a power unit mounted thereon, a pair of forward wheels and at least one rear wheel operatively supporting said frame, a housing comprising a substantially flat, horizontally disposed disk-like member of substantially circular outline and having a substantially uninterrupted circumferentially depending flange, said housing being supported from said frame forwardly of said front wheels, a rotatable cutter supported below said disk-like member and above the plane of the lower edge of said flange, selective drive means operatively connecting said power unit to said forward wheels and to said cutter independently of each other, and a handle means connected to said frame and extending upwardly and rearwardly to a point rearwardly of said wheels, whereby said mower may be tilted about said rear wheels to raise said cutter.

3. A power mower, comprising a frame having a power unit mounted thereon, a pair of forward wheels and at least one rear wheel operatively supporting said frame, a housing comprising a substantially flat, horizontally disposed disk-like member having a substantialy continuous peripheral depending flange, said housing being supported from said frame forwardly of said front wheels, a rotatable cutter supported below said disk-like member and within the vertical limits of said flange, means to selectively connect said power means to said forward wheels and to said cutter independently of each other or simultaneously, and a handle means connected to said frame and extending upwardly and rearwardly to a point rearwardly of said wheels, whereby said mower may be tilted about said rear wheels to raise said cutter.

4. A power mower, comprising a frame having a power unit mounted thereon, a pair of forward wheels and at least one rear wheel operatively supporting said frame, a housing comprising a substantially flat, horizontally disposed disk-like member having a substantially continuous peripheral depending flange, said housing being supported from said frame forwardly of said front wheels, a rotatable cutter supported below said disk-like member and within the vertical limits of said flange, and means to selectively connect said power means to said forward wheels and to said cutter independently of each other or simultaneously.

References Cited in the file of this patent

UNITED STATES PATENTS

| | | |
|---|---|---|
| 2,494,662 | Lind | Jan. 17, 1950 |
| 2,513,685 | Smith et al. | July 4, 1950 |
| 2,547,738 | Bosworth | Apr. 3, 1951 |
| 2,659,445 | Church | Nov. 17, 1953 |